Aug. 10, 1954  J. D. CONTI  2,686,128
METHOD FOR MAKING STUFFED PRODUCTS
Filed Jan. 21, 1950  2 Sheets-Sheet 1
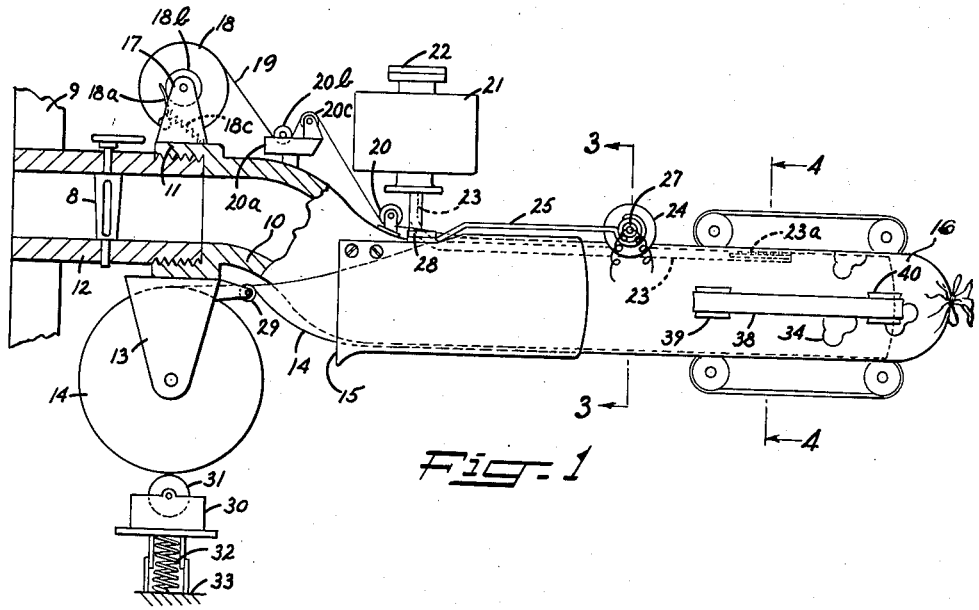
Fig. 1
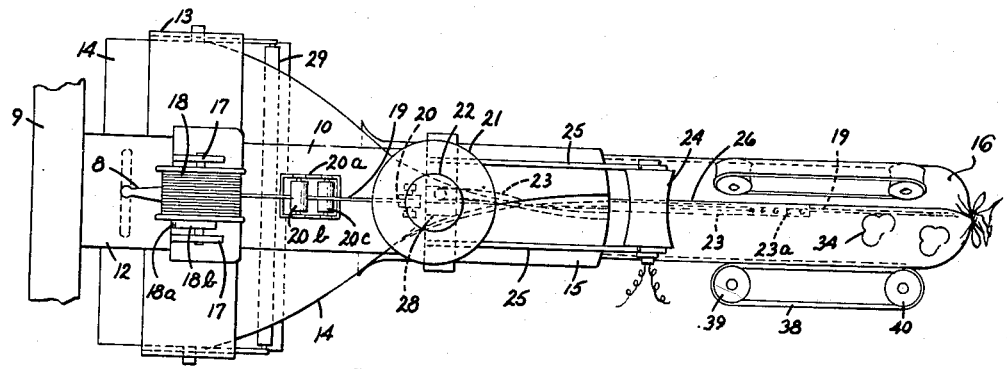
Fig. 2
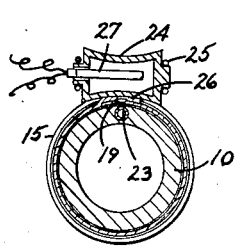
Fig. 3
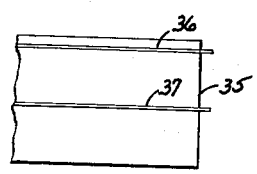
Fig. 4
Fig. 5
INVENTOR.
JOHN D. CONTI
BY
Thomas R O'Nally
ATTORNEY.

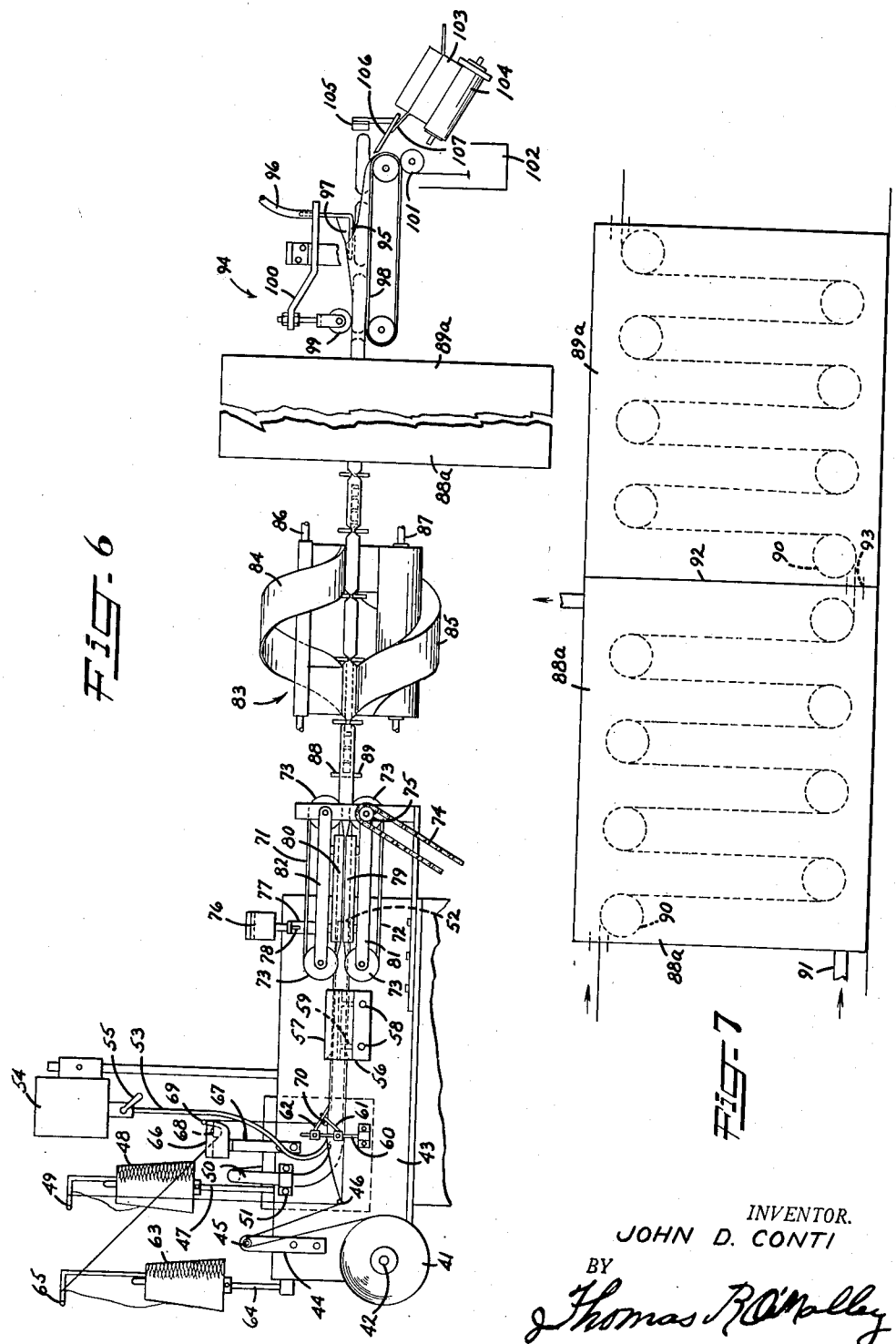

Patented Aug. 10, 1954

2,686,128

UNITED STATES PATENT OFFICE 2,686,128

METHOD FOR MAKING STUFFED PRODUCTS

John D. Conti, Philadelphia, Pa., assignor to American Viscose Corporation, Wilmington, Del., a corporation of Delaware Application January 21, 1950, Serial No. 139,830

8 Claims. (Cl. 99—171)

This invention relates in general to making stuffed products such as sausages, and in particular to a process and apparatus for the production of sausages.

At the present time the usual apparatus for the manufacture of sausages consists of a large closed chamber equipped with a nozzle through which the sausage meat can be forced by air pressure on the meat in the chamber. In the manufacture of "skinless" sausage, it is customary first to stuff the sausage meat in an artificial seamless casing, and then to cook and smoke the sausage and thereafter peel off the casing. In making "skinless" sausage and other small sausages, a small diameter casing having a length of several feet is shirred onto the nozzle or is pre-shirred and then slipped over the nozzle. The end of the casing is tied, and the casing is then filled with sausage meat. In the manufacture of frankfurters by this process, there are required a number of separate hand operations, one for each individual casing, and inasmuch as the length of the individual casing is limited, the interruptions of the stuffing process are numerous and consequently decrease the production. Since the length of the casing is limited by the length of the nozzle over which it must be shirred and the length of the natural casing is limited by the length of the animal organ from which it is obtained, these interruptions cannot be avoided in the conventional process.

On the other hand, in the manufacture of large-sized sausages, such as salami, bologna and the like, the artificial casing heretofore used is a large seamless casing not more than about two feet in length. The stuffing of such casings is entirely a discontinuous batch operation.

The primary object of this invention is to provide a process and apparatus for the continuous production of stuffed products, such as sausage.

An important object of the invention is to provide a substantially continuous process for the manufacture of stuffed products in tight-fitting casings of an alkali-soluble material.

An additional object of the invention is to provide a process for the stuffing of a casing of alkali-soluble cellulosic material simultaneously and continuously with its formation.

Another object of the invention is to provide apparatus for the manufacture of stuffed products, in particular of sausages, simultaneously with the formation of casings of an alkali-soluble material.

Another object is to provide a stuffed sausage encased in an alkali-soluble casing which is suitable for the preparation of the so-called "skinless" frankfurters.

Other objects and advantages will be apparent from the drawing and the following description.

The invention includes a process for the production of stuffed products, such as sausage, which comprises simultaneously forming a continuous tubular casing from an alkali-soluble material and stuffing said casing under pressure to produce a stuffed product in a tight fitting casing which is then followed in continuous sequence without interruption by linking, cooking and/or smoking, cooling, stripping when desired, and packaging; more particularly, a process for the production of sausages by the use of a stuffing horn or nozzle and a tubular casing comprising continuously shaping a long piece of flexible sheet material into a tube about a stuffing nozzle, sealing the overlapped edges of the sheet by an alkaline adhesive material, positioned between the edges, while the sheet surrounds the nozzle to form a tubular casing, applying a neutralizing material to the inside of the casing before it is discharged from the stuffing horn, and stuffing the casing with sausage meat under pressure concurrently with its formation.

According to the present invention, there is also provided an apparatus for the simultaneous manufacture of tubular casings and the stuffing of such casings with plastic materials, such as sausage meat, comprising the combination of a stuffing horn nozzle adapted to fit onto a container for the plastic material, means for continuously shaping a flexible sheet material into a tubular casing about the nozzle, means for supplying adhesive material to one of the edges to be overlapped before or during overlapping, means for sealing the edges of the sheet as it passes over the nozzle, and means for applying a neutralizing material to the inside seam of the casing before it leaves the end of the nozzle.

It is a characteristic feature of the present invention that the tubular casing is stuffed under pressure so as to produce a stuffed product in a tight fitting casing. A second characteristic feature is that the pressure applied to the plastic material, such as sausage meat, as it is stuffed in the casing, causes or assists the passage of the casing over the nozzle so that while that portion of the sealed casing which extends beyond the end of the nozzle is being stuffed, a succeeding portion is being shaped and sealed into a casing on the nozzle. Thus the operations of forming the casing and stuffing the casing are carried out simultaneously and concurrently which are then followed in continuous sequence without interruption by linking, cooking and/or smoking, cooling, stripping when desired, and packaging.

For a more complete understanding of the present invention, reference should be had to the accompanying drawing, in which:

Figure 1 is a side elevation, partly in section, of one embodiment of apparatus according to the invention;

Figure 2 is a top plan view of the apparatus shown in Figure 1;

Figure 3 is a cross-sectional view of the apparatus of Figure 1 taken along line 3—3 of the embodiment shown in Figure 1;

Figure 4 is a partial section taken on line 4—4 of Figure 1;

Figure 5 is a plan view of a form of prepared sheet that may be employed in the apparatus of Figures 1 to 4;

Figure 6 is an elevation showing the entire sequence of operations from stuffing to packaging; and Figure 7 is a diagrammatic elevation in section illustrating diagrammatically the passage of the stuffed product through the cooker or smoker, and cooler of Figure 6.

The seamed artificial casing is formed by folding about the stuffing horn a flexible sheet of an alkali-sensitive material, such as regenerated cellulose, cellulose acetate and the like, or, preferably, an alkali-soluble water-insoluble cellulosic material, such as a lower alkyl, hydroxyalkyl, or carboxy-alkyl ether of cellulose, preferred specific materials being methyl, ethyl, hydroxyethyl, and carboxymethyl ethers of cellulose, mixed cellulose ethers of this class, and also sheets derived from cellulose ether-xanthates, cellulose xanthoethers, cellulose thiourethanes, and cellulose xantho fatty acids.

Since the seamed tubing is formed from a hydrophilic cellulosic material, which is water-permeable but greaseproof, it can be used in the conventional methods of manufacturing "skinless" frankfurters. The hydrophilic nature of the casing permits the passage of air and moisture vapor while preventing loss of grease and fat, thus facilitating the formation of a "self-skin" of coagulated protein material on the surface of the meat. In addition, the hydrophilic casing is capable, during stuffing, curing and cooking operations, of shrinking or expanding to conform with the changing size and shape of the sausage without the formation of wrinkles and without bursting. On the other hand, the non-thermoplastic nature of the hydrophilic casing is advantageous in the manufacture of "skinless" sausages since it eliminates adhesion between the casing and the sausage meat and thus facilitates subsequent stripping of the casing.

In accordance with the present invention, the adhesive used in sealing the overlapped edges of the sheet in forming the tube may be any alkaline liquid, such as a dilute solution of caustic soda or potash. If desired, the adhesive may be an alkaline solution of one of the alkali-soluble cellulosic materials of which the casing may be made and the cellulosic material in the adhesive may be the same as or different than that of the sheet. The adhesive may be applied to one edge of the sheet before it is formed into a tube or it may be inserted between the edges of the sheet as they are overlapped in forming the tube. If desired, a coating of the alkaline adhesive material may be applied adjacent one edge of the sheet and dried before the sheet is wound up into a roll or before it is passed into the tube-forming machine. In this latter case, it is merely necessary to wet the coating edge of the sheet as it proceeds to tube-forming position before or after the edges are overlapped. In a preferred form of the invention, the amount of adhesive applied is controlled by absorbing it within a porous strand or carrying it as a coating on the surfaces of a continuous strip or strand of non-porous character. For example, a yarn or thread of cotton, regenerated cellulose, or other fibrous material may be passed through a bath of the alkaline medium and then carry out of such bath an amount of adhesive determined by the size and nature of the strand. The still wet strand may then be guided directly to one edge of the sheet or to the space between the overlapped edges of the sheet. Again, a strip of a plastic material such as a monofilament of regenerated cellulose or the like may be passed through the bath of the alkaline medium and then directly to one edge of the sheet or between the overlapped edges. If desired, the strip or strand may first be adhered adjacent one edge of the sheet as in Figure 5, such as by drying the wet strip or strand in contact therewith. In this latter case, it is merely necessary to wet the adhered strip or strand with water as it proceeds to sealing position between the overlapped edges.

After the edges have been overlapped with the adhesive supplied therebetween, they are preferably subjected to pressure as they proceed along the nozzle to assure good adhesion. When certain products are to be stuffed in the casing, it is desirable to neutralize the alkali before the material is stuffed into the casing. This is done in accordance with the invention by applying an acid liquid, such as vinegar to the inside seam before the sealed casing leaves the nozzle.

The present invention also contemplates the sealing or securing together of the two overlapped edges of the sheet material by means of an interposed composite thread, strand, filament, or the like. The sealing along the joint may be complete or partial, depending upon the extent of closure desired or necessary in the particular case. The composite sealing means may involve two or more continuous filaments laid side by side, one or more but not all of said filaments being susceptible of activation to an adhesive character by water or an alkaline medium. Preferably, pressure is applied with the activating agent. One or more of the filaments is not affected by the activating agent and may be termed the non-adhesive element of the composite sealing means, whereas the first-mentioned filament or filaments is the potentially adhesive element thereof. The potentially adhesive element may be a filament or a bundle or aggregation of filaments in the form of a yarn, thread, or like twisted or untwisted strand made of such materials as alkali-soluble cellulose ethers, or alkali-sensitive materials, such as regenerated cellulose rayon, cotton, or preferably cellulose acetate and partially saponified cellulose acetate, or the like.

Figures 1 to 4 show one embodiment of the apparatus comprising the combination of a nozzle 10 having a threaded end 11 adapted to screw on the outlet pipe 12 of a container 9 to replace the nozzle conventionally used thereon. The container 9 may be the conventional one used for sausage or other material to be stuffed into the casings. The meat or other material in the container 9 is customarily placed under pressure, and the valve 8 is adapted and arranged to control the flow of the material through the nozzle in the usual manner. On the underside of the nozzle 10, there is mounted a bracket 13 adapted to support a roll of the alkali-soluble sheet material 14 from which the casing is to be formed. On each side of the nozzle there is secured a tube-former 15 which encircles the nozzle and is arranged to shape the sheet material into a tubing 16 about the nozzle.

A bracket 17 may also be provided for rotatably supporting a supply spool 18 for a strip or thread of sealing material 19. The bracket may be supported in any fashion, either directly on the nozzle or separately therefrom. A drag or brake shoe 18a is urged by a spring 18c against a drum 18b secured to the spool shaft in order to properly tension the strip 19 during withdrawal. A guide or pulley 20 is mounted on the nozzle in line with the overlapped edges of the sheet within the former 15. A container 20a for water or an alkaline medium may be mounted on the nozzle or otherwise supported. A dip roll 20b and guide roll 20c may be carried by the container 20a to dip the strip 19 therein and guide it over the container edge to guide 20. There is also provided, such as by detachable mounting on the nozzle 10, a liquid reservoir 21 for acid. This reservoir has a lid 22 and a conduit 23 from the reservoir extends along the nozzle adjacent the seam 26 and terminates in small openings 23a over which the inside edge of the seam passes. The pipe 23 may be embedded in a groove 23b formed in the outer wall of the nozzle as shown more clearly in Figure 4. The groove may then be filled or calked at 23c to make a smooth outer surface that is flush with the outer surface of the nozzle 10.

An arcuate roller 24 supported on a forked spring 25 may be provided to apply pressure to the seam 26, preferably before or simultaneously with the application of the acid. The roller 24 may be hollow and may be provided with heating means, such as any form of electric heating coil or lamp, e. g. an infra-red ray lamp 27. Also, if desired, means may be provided to heat the strip 19 just before it is laid between the overlapped edges of the sheet being formed into a tube. For example, a heating element 28 may be secured in, on, or above the nozzle 10 between the pulley 20 and the roll 24, preferably in advance of the position of overlap of the edges of the sheet to be sealed so that strip 19 passes in contact with the heating element 28 or sufficiently close that its surface is pre-heated to control the flow of the alkaline medium or adhesive and quicken the final setting. Depending on the particular materials to be sealed and rendered adhesive, either or both of the heating means 27 and 28 may be employed or omitted, as desired. When the nature of the material passing through the nozzle 10 requires the avoidance of excessive heating, the nozzle should be made of a material that has extremely low heat conductivity or it should be shielded from the heating means 27 and/or 28, when such is used, by a layer of insulating material.

It is desirable to feed the sheet material in such a position that the center and the edges of the sheet are displaced an equal distance from the longitudinal axis of the nozzle. This is done, according to the embodiment of the invention shown in Figures 1 and 2, by forming the nozzle with a reverse curve at the end adjacent to the container 9, and there is provided a guide roller 29 which is so positioned that its upper surface lies in the same plane with the axis of the free end of the nozzle 10. Thus, when the roll of sheet material is passed over this roller, it is roughly at the same level as the center of the nozzle and is suitably positioned for the formation of the tubing. It is to be understood that the nozzle may be reversed so that the roll 14 is positioned on the top side of the nozzle while the strip supply and cooperating elements are on the under side, in which case the seam is formed on the under side of the nozzle. A container 30 may be provided for water, alkali solution or alkaline adhesive solution and is provided with a coating roll 31 which bears against the surface of roll 14 adjacent one edge thereof. The coating roll container 30 is urged upwardly by a spring 32 bearing against a fixed portion of the frame 33.

The forward motion of the casing over the horn 10 may be derived entirely from the stuffing pressure. However, it may be moved more positively by the assistance of belts 38 driven at constant speed over pulleys 39 and 40.

The coating roll 31 may be used exclusively to provide the adhesive in which event the strip supply at 18 need not be used nor will the dip roll system comprising roll 20b and the pulley 20 be necessary. When operating in accordance with this system, a thin film of an alkaline solution, such as a dilute solution of caustic soda or a solution of caustic soda containing an alkali-soluble cellulosic material of the type from which the sheet itself may be formed, is provided on roll 31 which rotates in the bath in container 30. This alkaline solution is coated as a thin narrow strip adjacent or along one edge of the sheet as it passes during unrolling on its way to the tube former 15. At this position, the coated edge is overlapped upon the opposite edge of the sheet material so that the adhesive coating is disposed therebetween. After leaving the overlapping position, the tubular structure passes under the pressure roll 24 and the inside seam passes over the openings 23a by which an acid such as vinegar is applied to neutralize any alkali remaining. Heating of the roll 24 is optional but serves to hasten the setting of the adhesive before the acid is applied to the seam. Alternatively, the bath 30 may be omitted or remain unfilled in which event reliance may be placed upon the strip 19 derived from the roll 18 to provide the adhesive between the overlapped edges. In this case, the strip 19 passes into the liquid bath 20a, over 20c and under pulley 20 which guides it into position between the overlapped edges. As discussed hereinabove, the strip 19 may be made of various materials. When it is a cotton thread, the bath 20a may contain either a dilute solution of an alkaline material, such as caustic soda or a dilute alkaline solution of a cellulose ether which is alkali soluble. Any of the ethers mentioned hereinabove are suitable. The thus coated cotton thread is guided by pulley 20 into the space between the overlapped edges of the sheet and bonds the surfaces of the sheet by the action of the alkali upon the alkali-soluble material of which the sheet is formed. When the thread contains a cellulose ether, an exceptionally good autogenous bond is obtained. As the bonded seam passes along the nozzle, it is pressed by the roll 24 and the inside of the seam passes over the openings 23a which supply an acid, such as vinegar to neutralize any excess caustic on the interior of the casing.

In a third case, both the coating container 30 and the strand 19 may be employed. Thus, water may be present in the container 30 and the strand 19 may be a pre-dried alkali-impregnating strand. In this case, the container 20a may be omitted or left empty as the water coated upon the edge of the sheet by the roll 31 will activate the dry alkali in the strand as the strand contacts the water between the overlapped edges of the sheet. Other variations in operation may be employed as desired.

In all cases, the flow of the sausage meat is controlled by means of the valve 8 and, if desired, the stuffed casing is twisted at intervals to provide sausage links.

In view of the fact that the casing of the present invention is formed from a sheet material, a number of important commercial advantages arise therefrom. For example, it is difficult to apply a moistureproof composition to the seamless casings heretofore employed, while it is a relatively simple matter to apply such a moistureproof composition to one side of the sheet material used in the present invention. The coated sheet material is then formed into a tube and stuffed according to the present invention with the moistureproof coating on the outside. To prevent the moistureproof coating from interfering with the sealing of the sheet by means of certain of the adhesives, the edges of the sheet material are preferably left free of coating, or if the sheet is coated over its entire surface the coating may be removed in a preliminary operation by the application of a solvent therefor and a wiping roll.

The sheet material employed in forming the casing may be prestretched, and in the now preferred embodiment, the sheet material is prestretched longitudinally, whereby there is imparted to the casing the ability to stretch transversely to a substantial extent without stretching longitudinally. Thus, the casing may expand and shrink during the stuffing and curing, but when the sausage is hung in the smoke room, the casing will not tend to elongate. Instead, it provides a stuffed sausage having relatively square shoulders which are desirable.

The sheet material may also be pre-printed before being formed into tubing and since the casing material may be printed in sheet form, considerable economies can be achieved in the cost of printing. Thus, the printing may be applied to a roll of full mill width and the printed roll then slit into strips of the width required to form casings. Accordingly, the present invention may provide a seamed casing bearing indicia 34 thereon as shown in Figure 1. When the printing is applied on the outside, the ink may be any conventional ink which will adhere to the casing during the operations of stuffing, cooking (commonly at 180° F.), and which will be resistant to the action of grease, smoke and water. However, unlike the seamless tubing heretofore used, the present seamed casing may be pre-printed and folded so that the printing is located on the inner surface of the casing and is viewed through the transparent casing. In this case, it may be desired to employ an ink comprising an approved fat-soluble food dye which will transfer from the inner walls of the casing to the surface of the meat stuffed therein, so that the meat will bear the printing after the casing has been stripped from the sausage. There is thus provided a "skinless" sausage bearing printing or other indicia.

It must be realized in carrying out this invention that the foregoing description shows but few of numerous embodiments thereof, and it will be obvious that numerous variations and mechanical equivalents may be substituted to attain the same ends. For example, there is shown in Figures 1 to 4 a complete casing-forming nozzle which may be sold as a unit and substituted on a conventional sausage making machine for the nozzle used thereon prior to the present invention. Certain parts of the tube-forming means, e. g. the brackets with the roll 14 of sheet material and/or the spool 18, and/or the alkali and acid container or reservoir and cooperating parts, may be attached integrally to the meat container itself or mounted upon a separate support. Alternatively, the entire casing-forming nozzle may be made an integral part of the stuffing machine as originally manufactured. Further, the roll of material 14 may be enclosed in a housing of conventional design to protect the sheet material from dust and contamination. When it is desired to pre-wet the casing material before stuffing, this can readily be done by having the roll 14 immersed in a water bath, or suitable guide rolls provided for passing the sheet from the roll through a water bath or through a spray of water prior to the sheet being formed into a tube. It has been found that even though the sheet may be wet, a rapid sealing of the overlapping layers at the seam can still be effected by the alkaline strip. The shrinking of the wet tubing is desirable in packing certain meat products containing water because the wet casing on drying shrinks and follows the contraction of the meat product. It is also to be understood that instead of the pressure roll 24, there may be employed equivalent mechanical means such as a shoe adapted to press on the seam or a positively rotated stiff brush adapted to wipe the area of the seam.

Instead of using an alkali-soluble water-insoluble cellulose ether material for making the tubing, there may be employed alkali-sensitive sheet materials, such as regenerated cellulose, cellulose acetate, partially saponified cellulose acetate, and the like. To permit continuous and rapid production of the tubing, the alkaline sealing liquid for any particular sheet material must be one which produces immediately a strong seam, preferably an autogeneous sealing of the contiguous layers of the sheet material. With regenerated cellulose the seam may be formed by use of a rapidly acting alkaline adhesive such as tribenzylmethyl ammonium hydroxide or an aqueous solution containing 10% sodium hydroxide and, if desired, 8% dissolved alkali-soluble water-insoluble cellulose ether.

The seamed tubing and its method of formation according to the present invention readily permits the use of a tear strip or rip cord in the tubing. For example, a narrow strip or thread may be fed concurrently with the sealing strip from the roll 18 so that the tear strip or tear cord is located at the seam. Figure 5 shows a variation in which the sheet 35 has adhered to it two lengths of tear and/or sealing strips 36 and 37. Strip 36 may serve as both a tear and a sealing strip since it is secured along one edge. Strip 37 serves as an additional tear strip on the other side of the final casing and is preferably secured by an adhesive that is innocuous when foods are to be stuffed into the casings. These strips may be unitary or composite in structure and of materials hereinbefore mentioned.

Figures 6 and 7 illustrate a modification in which the production of skinless frankfurters is accomplished in a continuous manner. Although the same stuffing and tube-forming system may be employed in this embodiment as previously described and shown in Figures 1 to 4, this section of the continuous system is somewhat modified as shown in Figure 6 for the purpose of continuously introducing a tear strip or strand into the tubing formed in a position 180° from the position of the seam of the tubing. As shown, a roll 41 of the sheet material having proper width to form, upon tubing, a frankfurter casing of the desired diameter, is mounted on a rotatable spindle 42 on the frame 43. A bracket 44 carries a rotatable pulley 45 about which the sheet proceeds from the supply roll 41. A fixed or rotatable guide 46 is carried by the frame 43 at a level approximately corresponding to the bottom of the casing being formed and stuffed. A bracket 47 supports a package 48 of a strand material which is guided about an overhanging guide post 49 and then down to the inside of the tubing being formed. The pipe 50 secured at 51 to the frame serves to conduct the material to be stuffed into the casing being formed and has a horizontally extending end portion terminating at 52. A pipe 53 is connected with a receptacle 54 adapted to receive vinegar or the like by means of a valve 55 and has its terminal proportion imbedded within the upper surface of pipe 50 and provided with perforations in a manner similar to the tube 23 of Figures 1 to 4. Before the tubing reaches the acid discharging perforations, however, it must pass between the shoes 56 and 57 which serve to exert pressure upon the joint being formed. The shoes are provided with opposed semi-cylindrical channels adapted to bear against the tubing or casing being formed. The lower shoe 56 is fixed to the frame by cap screws 58 and to prevent the upper shoe from being carried along, it may be provided with downwardly extending pins 59 which are laterally spaced from the semi-cylindrical groove and fit in mating bores in shoe 56.

A bracket 60 supports a sloped guide 61 which serves to fold the upper edge of the sheet around the pipe 50 which serves as an inside mandrel to guide the shaping of the sheet into a tube. A similar sloped guide 62 lays the opposite edge of the sheet over into overlapped position.

The seaming strand may be derived from a package 63 supported on a bracket 64 and provided with an overhead guide 65. As in the preceding embodiment, this strand may pass into an alkaline liquid contained in a receptacle 66 supported on a bracket 67. A roller guide 68 may serve to submerge the travelling thread and a guide 69 may be provided at the edge of the receptacle. From the alkaline bath, this sealing thread may pass about a guide 70 into the space between the overlapped edges of the tubing being formed. A pair of opposed belts 71 and 72 are driven about pulleys 73 as by means of a chain 74 and sprocket 75. Although only one belt is shown as being driven, both may be, if desired. A receptacle 76 is provided on a bracket 77 and has a discharge tube 78 provided with a very small orifice through which acid, such as acetic acid or vinegar contained in 76 may drip slowly upon the upper belt 71. This acid is carried around into contact with the outer face of the seamed tubing and neutralizes the excess alkali. A pair of semi-cylindrical pressing shoes 79 and 80 are disposed in opposite relationship between the pulleys 73 and serve to support the exterior wall of the casing as it is being stuffed, thereby preventing any possible rupture of the seam near the position of stuffing where the stuffing pressure is inclined to be excessive. These shoes are rigidly supported on the bars or straps 81 and 82 respectively.

From the stuffing position, the continuous filled casing proceeds to a linking device which is diagrammatically shown at 83. This linking device may be of any suitable construction but for purposes of illustration, the form of device shown in U. S. Patent 639,648 is shown. It comprises two spiral cams 84 and 85 respectively which are rotated in opposite directions on shafts 86 and 87. A pair of chains carry a series of upper pairs of pins 88 and a series of lower pairs of pins 89 (the rear pin of each pair is hidden behind the front pin shown), these pins being spaced apart along the chains a distance corresponding with the length of frankfurter desired. Succeeding sets of four pins each pinch the filled casing at spaced intervals and alternate sections or links are twisted by the cams 84 and 85 relative to the intervening lengths which are isolated from the twisting action by the pins. Further description of this construction is not thought necessary since adequate details can be obtained by referring to the patent mentioned. From the linking station, the frankfurters proceed to the cooking, smoking and cooling chambers 88a and 89a (see particularly Fig. 7) wherein the linked frankfurters pass over a series of guiding rollers or pulleys 90. As shown in Figure 7, a single housing may be divided into a cooking or smoking chamber 88a which may be heated by any suitable means and into which any desired smoke or vapors may be introduced for flavoring such as by means of conduit 91. A partition 92 provided with an opening 93 separates the cooling chamber 89a from the cooking chamber. The cooling chamber may be naturally or artificially cooled by any suitable means. From the cooling chamber, the frankfurters proceed to the stripper 94 when it is desired to produce skinless frankfurters or wieners. This device may be of any suitable form and may comprise a tube 95 adapted to receive compressed air by means of a flexible conduit 96. The back of the tube is provided with an upright knife blade 97. A travelling belt 98 may serve to carry the frankfurters past the compressed air stripping knife and a guide wheel 99 carried on a bracket 100 may be provided to hold the wieners down against the belt. The stripped casing proceeds over the end of the belt between it and a nip roller 101 to a receptacle 102. From the belt 98, the stripped wieners are deposited in a carton 103 which is moved by belt 104 substantially at right angles to the path of the wieners approaching it. A stationary bar 105 is disposed just beyond the end of the belt 98 and is inclined from a direction at right angles to the direction of movement of the belt 98 so that the advancing wiener is deflected into a position more or less transverse of the belt before it falls so that it may roll down the guiding plate 106 into the carton 103 which is brought into position by the belt 104 with its flap 107 under the plate 106.

The web of casing material may contain reinforcing fibers. For example, a multiplicity of loose natural or artificial short fibers may be dispersed in a solution of the alkali-soluble water-insoluble cellulose material and the solution formed into a web. Alternatively, a thin tissue paper formed of natural or artificial fibers may be impregnated and coated with a solution of the alkali-soluble water-insoluble cellulosic material which is coagulated by treatment with an acid, washed and dried. The presence of the loose fibers or of the tissue paper does not interfere with the sealing of the sheet material by the alkaline adhesive. The coatings containing fibers are stronger, less expansible and more opaque. Therefore, such fibrous casings are especially adapted for liver sausage and the like.

While reference has been made, for purposes of description, to the preparation of sausage, it is to be understood that the invention is not limited to such stuffed products but is equally advantageous for the production of encased stuffed products of plastic nature such as ice cream, fats, scrapple and other meat products, as well as cheese, lard, oleomargarine, greases, snuff, caulking compound, and other products normally stuffed into casings, and in the appended claims the expression "stuffed products" is intended to include all such products.

The present invention has numerous advantages in the production of both frankfurters and large size sausages. The invention provides for a continuous process which results in substantial economies in manufacture, reduces labor requirements and increases the output per machine. As the casings are always uniform in diameter, the product is more uniform than when individual casings are stuffed according to prior practice. Further, since the present process produces a casing from a flat sheet, the sheet may be printed with an all-over design extending to the edges, thus permitting the design in the finished stuffed sausage to extend completely around the sausage. The use of a flat sheet also permits economies in moistureproofing or otherwise coating the sheet material before its formation into a casing. Moreover, when the tubing is formed from an alkali-soluble cellulose ether sheet material and utilized in the manufacture of so-called "skinless" frankfurters, the stripped casings may be cleaned, redissolved and recast into sheet material for the further production of tubing. This reuse of the stripped casing is not possible with the regenerated cellulose casings heretofore used in the manufacture of "skinless" frankfurters because it is not practical to redissolve regenerated cellulose for the formation of additional viscose tubing owing to the chemical degradation which occurs when such films are rexanthated. Numerous other advantages will be obvious to those skilled in the art.

The foregoing description is merely illustrative of the invention and is not a limitation thereof, and it is to be understood that the scope of the invention will be defined in the following claims.

I claim:

1. A process for the production of tubular casings comprising guiding a flexible sheet of indefinite length of an alkali-soluble, water-insoluble material longitudinally to a forming position, continuously shaping the sheet into a tubular form with the longitudinal edges overlapped to form a part of the wall of the tube, sealing the overlapped edges of said sheet with an alkaline medium to form a sealed tubular casing, and neutralizing the sealed juncture by applying an acidic material thereto inside the casing.

2. A process for the production of stuffed products comprising guiding a flexible sheet of indefinite length of an alkali-soluble, water-insoluble material longitudinally to a forming position, continuously shaping the sheet into a tubular form with the longitudinal edges overlapped to form a part of the wall of the tube, sealing the overlapped edges of said sheet with an alkaline medium to form a sealed tubular casing, neutralizing the sealed juncture by applying an acidic material thereto inside the casing, continuously feeding a stuffing material through a path inside the forming, sealing and neutralizing positions, and continuously stuffing said casing with said material concurrently with its formation.

3. A process for the production of tubular casings comprising guiding a flexible sheet of indefinite length of an alkali-soluble, water-insoluble material longitudinally to a forming position, continuously shaping the sheet into a tubular form with the longitudinal edges overlapped along a line extending generally parallel to the length of the tube to form a part of the wall of the tube, sealing the overlapped edges of said sheet with an alkaline medium to form a sealed tubular casing, and neutralizing the sealed juncture by applying an acidic material thereto inside the casing.

4. A process for the production of stuffed products comprising guiding a flexible sheet of indefinite length of an alkali-soluble, water-insoluble material longitudinally to a forming position, continuously shaping the sheet into a tubular form with the longitudinal edges overlapped along a line extending generally parallel to the length of the tube to form a part of the wall of the tube, sealing the overlapped edges of said sheet with an alkaline medium to form a sealed tubular casing, neutralizing the sealed juncture by applying an acidic material thereto inside the casing, continuously feeding a stuffing material through a path inside the forming, sealing and neutralizing positions, and continuously stuffing said casing with said material concurrently with its formation.

5. The process of claim 4 in which the sheet is drawn through the forming position to the stuffing position by the force exerted on the casing by the stuffing action.

6. The process of claim 4 in which the sheet comprises an alkali-soluble water-insoluble cellulose ether, the sealing is effected by the application of an alkaline liquid to at least one of the edges to be sealed, and the neutralization is effected with vinegar.

7. The process of claim 4 in which the sealing is effected along a narrow strip and a strip of the outer lap of the sheet is left unadhered along its exposed edge.

8. A process in accordance with claim 7 in which the strip is a composite strand, one ply of which is activatable by an aqueous medium to an adhesive condition and another is not whereby the seal comprises a tearing element.

References Cited in the file of this patent

UNITED STATES PATENTS

| Number | Name | Date |
|---|---|---|
| 1,484,741 | Schonland | Feb. 26, 1924 |
| 1,797,137 | Gochnauer | Mar. 17, 1931 |
| 2,027,545 | Mapes | Jan. 14, 1936 |
| 2,051,922 | Vogt | Aug. 25, 1936 |
| 2,113,658 | Lakso | Apr. 12, 1938 |
| 2,169,936 | Wagner | Aug. 15, 1939 |
| 2,234,054 | Mason | Mar. 4, 1941 |
| 2,340,951 | Freeman | Feb. 8, 1944 |
| 2,401,773 | Reichel et al. | June 11, 1946 |
| 2,477,768 | Remer | Aug. 2, 1949 |
| 2,490,930 | Thompson | Dec. 13, 1949 |
| 2,575,467 | Reichel et al. | Nov. 20, 1951 |